United States Patent [19]

Billet

[11] 4,236,610

[45] Dec. 2, 1980

[54] CALIPER BRAKE WITH AXIALLY ELONGATE CYLINDRICAL BRAKING MEMBER

[75] Inventor: René Billet, Lamorlaye, France

[73] Assignee: Societe Anonyme Française du Ferodo, France

[21] Appl. No.: 5,722

[22] Filed: Jan. 23, 1979

[30] Foreign Application Priority Data

Jan. 27, 1978 [FR] France .................. 78 02269

[51] Int. Cl.³ .......................................... F16D 53/00
[52] U.S. Cl. .................................................. 188/76
[58] Field of Search ............... 188/72.1, 73.3, 73.4, 188/76, 365

[56] References Cited

U.S. PATENT DOCUMENTS 3,853,207  12/1974  Rist ............................... 188/76

*Primary Examiner*—Duane A. Reger
*Attorney, Agent, or Firm*—Charles E. Brown

[57] ABSTRACT

A crown-type caliper brake comprises an axially elongate cylindrical braking member with respectively brake pads inside and outside the braking member and a caliper member operative to apply the brake pads against the braking member. The fixed support for the brake has two legs disposed respectively on opposite sides of an axial gripping plane containing a gripping axis through the central zones of the brake pads radially of the cylindrical braking member. Each of the legs has two fastener apertures for, e.g., a screw fastener and a pin respectively. One of the fastener apertures lies along a circle concentric with the axis of the cylindrical braking member substantially along which lie circumferential bearing surfaces on the legs for the brake pads. Preferably the apertures are disposed chordally of the braking member. A connecting bar may interconnect the legs outside the confines of the cylindrical braking member.

7 Claims, 5 Drawing Figures

CALIPER BRAKE WITH AXIALLY ELONGATE CYLINDRICAL BRAKING MEMBER

The present invention relates so-called crown type caliper brakes for automotive vehicles, i.e. caliper brakes of the type having a rotational braking member to be braked of axial elongate cylindrical configuration.

Such a brake comprises a fixed support adapted to be secured to any fixed member, the axle tube of a wheel to be braked for example, the cylindrical braking member being keyed to the corresponding wheel axle. The brake further comprises two brake pads disposed on respective sides of the cylindrical braking member and operating means adapted to urge the brake pads into operative contact with the braking cylinder along a generally radial direction, referred to as the gripping axis, which passes through the central zone of each of the brake pads.

The present invention relates more particularly to caliper brakes in which the operating means comprises a generally C-shaped operating member commonly referred to as the caliper member which is mounted for radial displacements with respect to the braking member, the brake pads being received between the arms of the caliper member. A first arm of the caliper member is adapted to urge a first brake pad against the braking member and a second arm of the caliper member urges the second pad against the braking member. The fixed support comprises two legs disposed on opposite sides of the axial plane of the brake containing the gripping direction, which plane is referred to hereinafter as the axial gripping plane. The legs are designed for permitting the securement of the fixed support to the fixed member such as the axle tube of the associated wheel, and for circumferentially retaining the brake pads during braking.

In practice, for securement to the fixed member, each leg of the fixed support has to the present day usually been equipped with a single fastener aperture for receiving a fastener means which is most often a machine screw. In French Pat. No. 72 05124 in the name of the assignee of the present application and the corresponding U.S. Pat. No. 3,853,207 to Rist also assigned to the assignee of this application, however, it was contemplated to provide two such fastener apertures in each leg of the fixed support.

Also in practice, the brake pads are usually both at least partially surrounded by the legs of the fixed support. Each of the legs of the fixed support for another part of the fixed support which is fixed to the leg is provided with a circumferential retaining surface for circumferential retention of the brake pads whereby during braking, owing to the tendency of circumferential drag of the brake pads because of their being applied against the revolving braking member, the brake pads abut circumferentially against the circumferential bearing surfaces of their corresponding legs.

Accordingly, one such leg which is the one which corresponds to the forward movement of the vehicle is normally the only one to sustain the braking forces. Of course the other leg sustains, on its own, braking forces when the brakes are applied while the vehicle is going backwards, which may nevertheless be a high momentary braking torque.

With a view to having each of the legs of the fixed support bearing part of the forces exerted during braking, it has been contemplated to attach them circumferentially to each other by one or more connecting bars. In brakes of this type an arched connecting bar usually interconnects the legs of the fixed support, within the confines of the cylindrical braking member as is the case in the aforesaid French patent. Although such an arrangement has in the past and continues to provide satisfactory results it nonetheless has various drawbacks.

First of all, the use of the connecting bar augments the weight of the brake and therefore increases its cost.

Further, the arched connecting bar increases the radial and/or axial dimensions of the fixed support which, in at least some conditions, makes the accommodation of the brake difficult on certain vehicles.

A general object of the present invention is to provide an arrangement which enables the arched connecting bar to be eliminated.

The invention is based on the observation that during braking the leg which sustains braking force in the forward direction of the vehicle on which it is mounted is subjected to a shifting or rocking force with respect to the axial gripping plane. It is therefore an object of the invention to minimize or at least substantially reduce this shifting force.

According to the invention there is provided a brake of the above described type in which each leg of the fixed support comprises two fastener apertures characterized by at least one of the apertures of one of the legs substantially lying on a circle concentric with the cylindrical braking member along which lie the associated circumferential bearing surfaces of the corresponding brake pad.

Each of the fastener apertures is adapted to receive an individual fastener means of which at least one is a screw fastener, the other being either a screw fastener or a pin or stud force-fitted in the aperture of the corresponding leg and in the fixed member on which the brake is mounted accordingly.

In any event the fact that according to the invention one of the fastener apertures lies on the circle along which the brake pads are circumferentially retained and therefore in practice in the vicinity of the cylindrical braking member, advantageously minimizes the shifting or rocking torque which the leg concerned is subjected to, the transmission of the braking force to corresponding securing means due to this brake pad being accomplished without any lever arm effect.

Preferably the fastener apertures in that leg are both disposed as close as possible to the cylindrical braking member further augmenting the resistance to the shifting of this leg.

In any event, thanks to the arrangement according to the invention, and taking account that both fastener means for securing the leg of the fixed support cooperate in bearing the braking forces to rigidify the leg against any shifting torque, the resistance to the shifting of the leg is sufficient so that at least inside the confines of the cylindrical braking member it is not necessary to attach the legs to each other by any sort of connecting bar.

Thus, in accordance with a preferred feature of the invention, within the confines of the cylindrical braking member the legs of the fixed support of the brake are devoid of any interconnection.

There results, all other things being equal, a decrease in weight, cost and dimensions of the brake.

The features and advantages of the invention will be brought out in the description which follows, given, by way of example, with reference to the accompanying drawings, in which FIG. 1 is an elevational view taken in the direction of arrow I in FIG. 4 of a caliper brake embodying the invention, the cylindrical braking member being assumed to be removed in FIG. 1;

Figure 1:
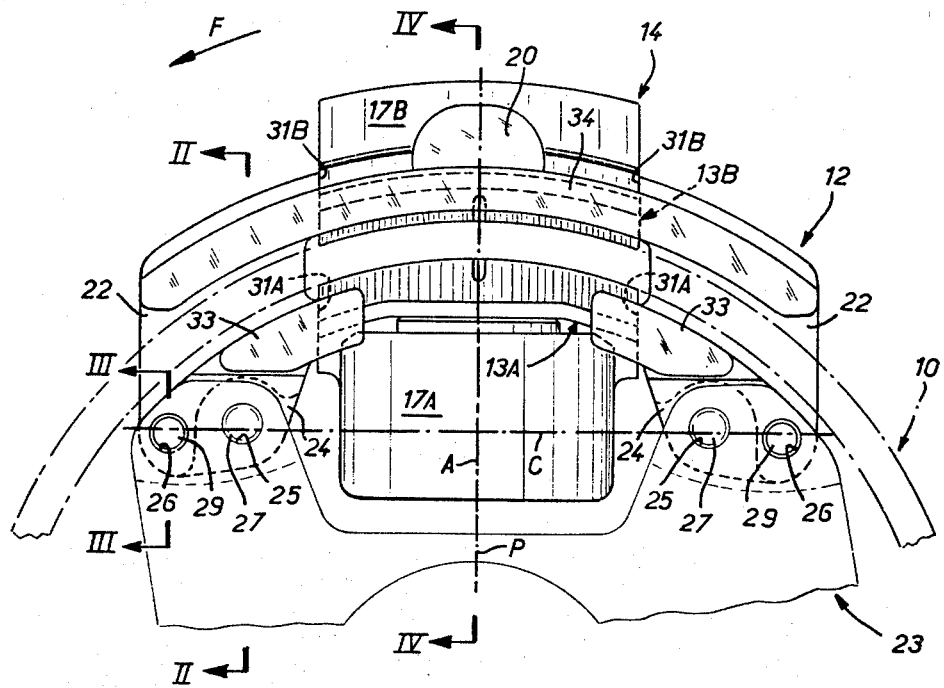
Figure 2:
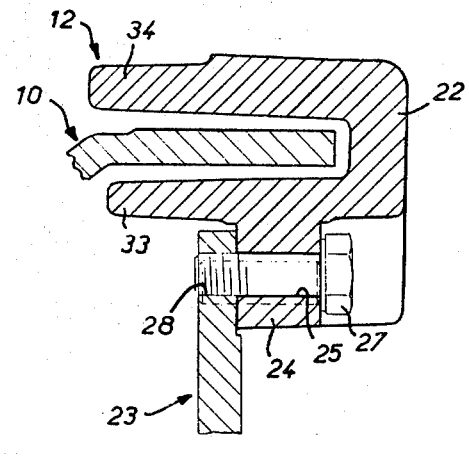
FIGS. 2 and 3 are fragmentary sectional views taken on lines II—II and III—III respectively.
Figure 3:
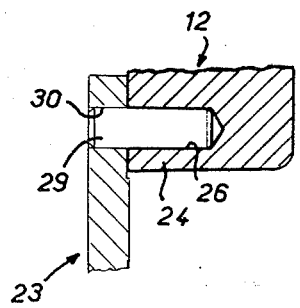

In the drawings is represented a caliper brake of the crown type, that is, having a rotational braking member 10 of generally axial elongate cylindrical configuration. The cylindrical braking member 10 is carried by a flange 11 by which it is secured to a shaft (not shown) to be braked. The caliper brake is, for example, a brake for an automotive vehicle.

Figure 4:
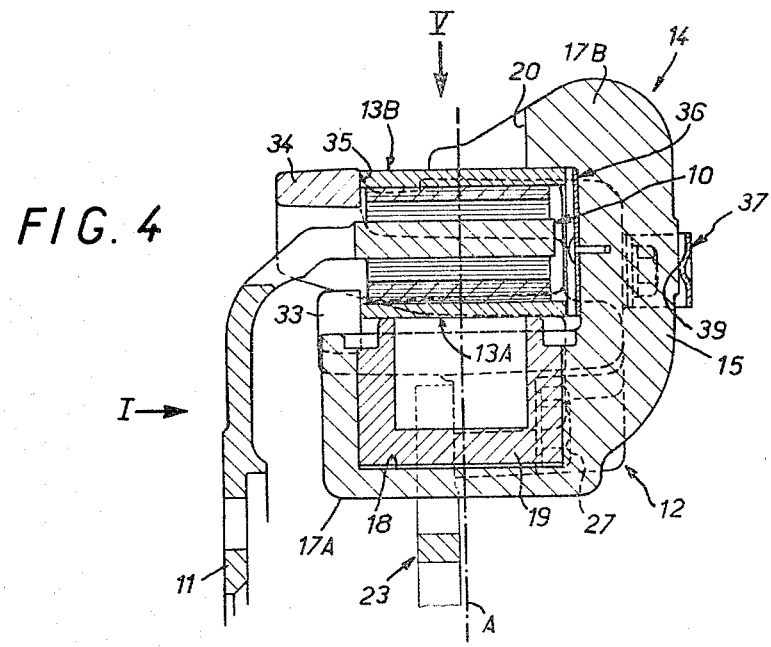
FIG. 4 is an axial sectional view taken on the line IV—IV in FIG. 1.
Figure 5:
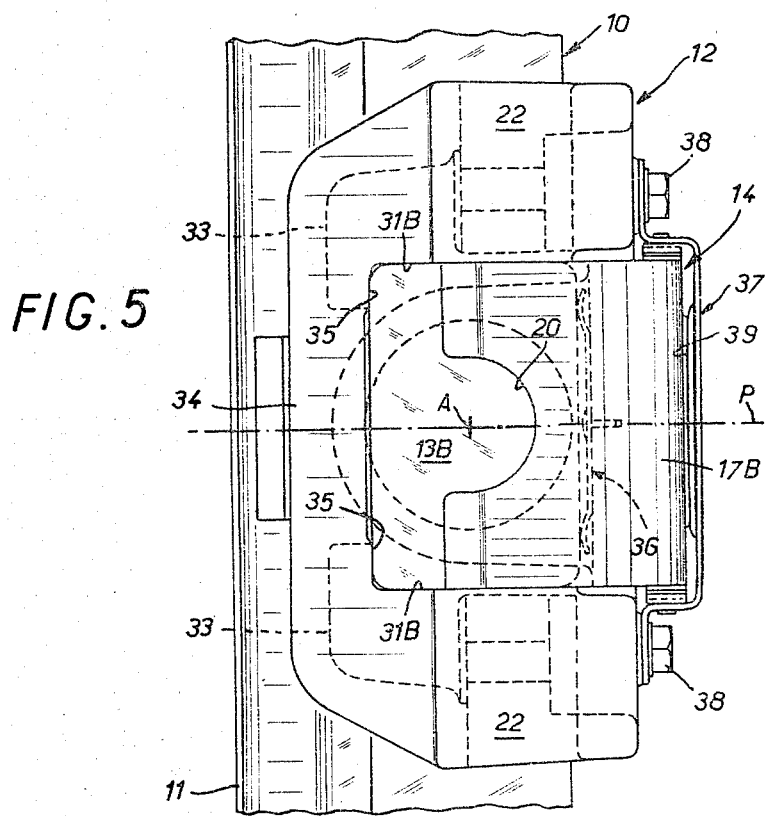
FIG. 5 is a fragmentary top plan view taken in the direction of arrow V in FIG. 4.

As is known per se, the caliper brake comprises a fixed support 12, two brake pads 13A, 13B being disposed respectively inside and outside of the cylindrical braking member 10, the first brake pad 13A cooperating with the inner surface of the cylindrical braking member and the second brake pad cooperating with the outer surface of the braking member. An operating or caliper member 14 is adapted to urge the brake pads 13A, 13B against the braking member along a radial direction A, referred to as the gripping axis, passing through the central zone of each of the brake pads. The gripping axis is represented by broken lines in FIGS. 1 and 4 and marked by a cross in FIG. 5.

In practice, as is known per se, the caliper member 14 is of generally C-shape and radially straddles a portion of the wall of the cylindrical braking member 10 and brake pads 13A, 13B. For this purpose, there is provided at the ends of an interconnecting intermediate portion 15 a first arm 17A which is hollowed out to define a bore 18 which forms a cylinder for a piston 19 which is adapted to urge the brake pad 13A and a second arm 17B which is notched at 20 where it engages the brake pad 13B.

To the rear of the piston 19 the cylinder 18 is in communication with a passageway, not shown in the drawings, which in turn is connected to a source of pressurized fluid.

Also as is known per se, the fixed support 12 is traversed by an axial plane of symmetry P containing the gripping axis A. The axial plane of symmetry referred to as the axial gripping plane is represented by broken lines in FIGS. 1 and 5.

The fixed support 12 comprises, disposed symmetrically with respect to the gripping plane P, two legs 22 each of generally yoke-like configuration to be received on oppposed sides of the cylindrical braking member 10. The legs 22 are designed for securement to a fixed member and for circumferential retention of the brake pads 13A, 13B.

In the illustrated embodiment the fixed member on which the fixed support member 12 is mounted is a flange 23 fast with the axle tube (not shown) surrounding the axle to be braked. For fastening legs to the flange inside the confines of the cylindrical braking member, each leg 22 is provided with a fastening lug 24. At least one of the fastening lugs 24 is designed for receiving two fastener means and accordingly has two separate fastener apertures 25, 26.

In practice, in the illustrated embodiment, each fastening lug 24 is provided with a pair of separate fastener apertures 25, 26.

As schematically shown in dash-dotted lines in FIG. 1, the fastener apertures 25, 26 in the fastening lugs 24 on each leg are disposed along a chord C of the cylindrical braking member 10 substantially perpendicular to the axial gripping plane P from one leg 22 to the other.

In the illustrated embodiment the fastener aperture 25 closer to the caliper member 14 is used for a screw fastener 27 which is screwed into the threaded aperture 28 in the fixed member 23 while the fastener aperture 26 is merely used for a pin 29 which is force-fitted in an aperture 30 in the fixed member 23.

Circumferential retention surfaces 31A, 31B are provided on each leg 22 for circumferential retention of the brake pads 13A, 13B. Each leg 22 has inside the confines of the cylindrical braking member 10 an abutment projecting towards the axial gripping plane P for bearing the braking pad 13A parallel to the axis of the cylindrical bearing member.

Outside the confines defined by the cylindrical braking member 10, the legs 22 are circumferentially attached to each other by a connecting bar 34 having supporting surfaces 35 which define axial bearing surfaces for the brake pad 13B. Thus the brake pad 13B bears directly against the connecting bar 34 parallel to the axis of the cylindrical braking member 10.

In order to urge the brake pads 13A and 13B against the abutments 33 and the connecting bar 34, respectively, there is provided a single spring means 36. The spring means 36, formed as a leaf spring, bears against the intermediate portion 15 of the caliper member 14, axial retention of the caliper member 14 being in turn ensured by a retaining bar 37 interconnecting the legs 22 perpendicular to the axial gripping plane P behind and outwardly of the intermediate portion 15 of the caliper member 14.

The retaining bar 37 is secured to the legs 22 by means of screws 38. Along the intermediate portion of the retaining bar which is in contact with the intermediate portion 15 of the caliper member 14 is provided an elongate stamped boss 39 of round cross section as viewed in FIG. 4.

The operation of such a caliper brake is well known per se. When pressurized fluid is conveyed to the bore which forms the operating cylinder 18, the piston 19 urges the brake pad 13A against the cylindrical braking member 10 and the caliper member 14 transmits the corresponding force to the brake pad 13B which is thereby urged against the outside of the cylindrical braking member 10. The braking member 10 is thus gripped between the opposed brake pads. When the fluid pressure is relaxed the braking member 10 is released.

During operation the caliper member 14 admits of radial displacement, guided by the legs 22, the caliper member 14 being in contact with the contact surfaces 31A, 31B of the lugs 22 provided for circumferential retention of the brake pads 13A, 13B and in contact with the retaining bar 37. Further by reason of the rounded surface of boss 39 on the retaining bar the caliper member 14 also admits of pivotal movement, when necessary to compensate for the coning of the cylindrical braking member in the course of its service life.

Furthermore, in the course of operation, assuming the direction of rotation of the cylindrical braking member 10 as denoted by arrow F in FIG. 1, the brake pads 13A, 13B, dragged by friction in the same direction, abut the circumferential retaining surfaces 31A, 31B of the lagging leg 22 relative to the direction of rotation, that is, the leg 22 which is to the left in FIG. 1.

As will be readily understood this lagging leg 22 is, owing to the circumferential thrust exerted against it by the brake pads, subjected to shifting or rocking torque which has the tendency to move it out of the axial gripping plane P by pivoting it about the fastener means that join it to the fixed member 23.

Other than the retaining force exerted by the connecting bar 34 outside the cylindrical braking member 10 the lagging leg 22 is, thanks to its securement to the fixed member 23, provided by two distinct fastener means, better apt to sustain the shifting or rocking torque than when there is a single fastener means as is usually the case.

This advantage is enhanced by the fact that the size of the lugs 24 on the legs 22 is minimized and therefore so is the lever arm between the point the braking force is applied to the point to which the force is transmitted.

In fact the apertures 25, 26 in each lug 24 are disposed in the immediate vicinity of the cylindrical braking member 10 and, particularly the fastener aperture farthest from the axial gripping plane P, namely the fastener aperture 26, lies along a circle along which is located the circumferential bearing surfaces 31A associated with the corresponding brake pad, namely brake pad 13A.

In the preferred embodiment the pins or studs 29 essentially have to withstand a shearing force, whereas the screw fasteners 27 have in addition to or in lieu of this shearing force a contact force in a plane perpendicular to the axial gripping plane P, due to the force exerted by the screws fasteners 27 as fasteners means.

It will be understood that the pins or studs 29 may be replaced by screw fasteners if desired.

Moreover, the present invention is not limited to the embodiment described and illustrated herein but encompasses all variations, alternatives, and modifications within the purview of the appended claims.

With this in mind, if desired, the both fastener apertures of a leg of the fixed support may be arranged chordally of the cylindrical braking member substantially parallel to the axial gripping plane P, and not perpendicular to the axial gripping plane, particularly if the amount of the projection beyond the support member 23 is to be reduced.

Moreover, double fastener apertures are not absolutely necessary for each of the legs 22, each of the legs being capable of accommodating high momentary braking forces, as mentioned previously.

For some applications at least, only one of the legs is provided with double fastener apertures, the other leg with only one.

Also, the pins or studs 29 may have a threaded tip which threadedly engages a hole in the fixed member 23.

Finally, the invention is not restricted to the case in which during braking both brake pads abut circumferentially against only one leg of the fixed support.

What is claimed is:

1. A caliper brake comprising a fixed support, a rotatable braking member of generally axially elongate cylindrical configuration, brake pads disposed respectively inside and outside the cylindrical braking member, a C-shaped caliper member disposed radially of and straddling said cylindrical braking member and said brake pads inside and outside thereof, said caliper member including a first arm having force-applying means for urging a first of said brake pads towards the cylindrical braking member and a second arm cooperable with a second of said brake pads so that in response to the operation of said force-applying means said caliper member transmits a corresponding force to said second brake pad whereby said brake pads grip said cylindrical braking member along a generally radial gripping axis passing through central zones of said brake pads; wherein the improvement comprises said fixed support having two legs disposed respectively on opposite sides of an axial gripping plane containing the gripping axis, said legs each having a circumferential bearing surface for each of said brake pads for circumferentially maintaining said brake pads during braking and two fastener apertures for receiving fastener means for fastening said fixed support to a support member, at least one of said fastener apertures in one of said legs having a portion thereof lying on a circle concentric with the axis of the cylindrical braking member along which also lie portions of the circumferential bearing surfaces associated with the associated said brake pad.

2. A brake as defined in claim 1, wherein said fastener apertures in said one leg are arranged chordally of said cylindrical braking member on a chord disposed substantially perpendicularly to the axial gripping plane.

3. A brake as defined in claim 2, wherein said fastener apertures in both legs all have portions which lie on the same chord of the cylindrical braking member.

4. A brake as defined in claim 1, wherein said fastener apertures of a said leg are disposed chordally of said cylindrical braking member and are substantially parallel to said axial gripping plane.

5. A brake as defined in claim 1, wherein the legs of said fixed support are separated within the confines of said cylindrical braking member.

6. A brake as defined in claim 1, wherein inside the confines of said cylindrical braking member each said leg of said fixed support has an abutment protruding relative to the axial gripping plane for bearing against the associated brake pad parallel to the axis of said cylindrical braking member.

7. A brake as defined in claim 1, wherein a connecting bar interconnects the legs of said fixed support outside the confines of said cylindrical braking member, and wherein the associated brake pad bears directly against said connecting bar parallel to the axis of said cylindrical braking member.

* * * * *